United States Patent [19]

Biess et al.

[11] 4,013,939
[45] Mar. 22, 1977

[54] MULTIPLE FEEDBACK CONTROL APPARATUS FOR POWER CONDITIONING EQUIPMENT

[75] Inventors: John Biess, Canoga Park; Yuan Yu, Palos Verdes Penn., both of Calif.

[73] Assignee: TRW Inc., Redondo Beach, Calif.

[22] Filed: Dec. 30, 1974

[21] Appl. No.: 537,294

[52] U.S. Cl. .................................. 323/17; 321/19; 323/20; 323/DIG. 1
[51] Int. Cl.² ...................... H02M 3/10; G05F 1/46
[58] Field of Search .............. 321/2, 18, 19; 323/4, 323/17, 20, 22 T, 22 SC, DIG. 1

[56] References Cited
UNITED STATES PATENTS

| | | | |
|---|---|---|---|
| 3,320,512 | 5/1967 | Kruger | 323/DIG. 1 |
| 3,356,930 | 12/1967 | Lupoli et al. | 323/DIG. 1 |
| 3,378,758 | 4/1968 | Goodenow | 323/DIG. 1 |
| 3,585,491 | 6/1971 | Petersen | 323/DIG. 1 |
| 3,602,801 | 8/1971 | Williamson | 323/DIG. 1 |
| 3,626,277 | 12/1971 | Munson | 323/17 |
| 3,665,291 | 5/1972 | Weischedel et al. | 323/17 |
| 3,675,159 | 7/1972 | Judd et al. | 321/19 |
| 3,772,588 | 11/1973 | Kelly et al. | 323/DIG. 1 |

Primary Examiner—A. D. Pellinen
Attorney, Agent, or Firm—John J. Connors; Edwin A. Oser; Donald R. Nyhagen

[57] ABSTRACT

An improved feedback control system to govern the cyclic operation of the power switch of a non-dissipative power conditioning equipment. The apparatus includes two or three control loops working in unison. The first causes the output DC level to be compared with a reference, and the error amplified for control purposes. The second utilizes the AC component of the voltage across the output filter inductor or the current through the output filter capacitor, and the third loop senses the output transients.

6 Claims, 3 Drawing Figures

4,013,939

MULTIPLE FEEDBACK CONTROL APPARATUS FOR POWER CONDITIONING EQUIPMENT

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention relates to the field of power conditioning equipment and, particularly, to control apparatus therefor.

2. Description of Prior Art

A non-dissipatively regulated power conditioning apparatus achieves voltage transformation and regulation through cyclic operation of its power switch. Consequently, a control system must be able to convert analog signals derived from the equipment output and from a control reference, through an analog-to-digital process, into discrete time intervals representing the ON and OFF states of the power switch. The modulated pulse train derived from the cyclic operation of the power switch is reconverted to analog form at the equipment output, by means of an energy storage element, ordinarily a low pass filter.

In conventional non-dissipative power conditioning equipment, this analog-to-digital-to-analog process is accomplished as shown in FIG. 1. Here the main power train is shown to comprise a series chopper, although it may also consist of a boost regulator, buck boost regulator, parallel inverter, series resonant inverters, or other conventional switching means. As shown, the series chopper comprises a switch 10, a "free-wheeling" diode CR, an energy storage element 20 (typically an LC low-pass filter) and the load resistor $R_l$. The switch itself can consist of any conventional switching device, such as a transistor or silicon-controlled rectifier (SCR).

The equipment DC output signal $E_o$ is processed by an analog control signal processor (ACSP) 25. The ACSP includes a summing junction 30 at which the output DC signal is compared with a reference voltage $E_R$ to generate a DC error signal. The latter is fed to a properly compensated amplifier 35 resulting in a signal to a second summing junction 40.

Here the amplified output is either combined with or transformed into a ramp function. The ramp function can be a flux ramp, via a magnetic device, or it can be a voltage ramp obtained, for example, by charging a capacitor. In any event, when the instantaneous ramp voltage output reaches a threshold level, it causes a threshold detector 45 (typically a Schmitt trigger) to change state.

This causes a pulse output to be passed from the threshold detector to a digital control signal processor (DCSP) 50. The DCSP in its most general sense, comprises a memory and timer, the timer being reset upon receipt of an input from the threshold detector. The output from the DCSP provides an input to the switch 10.

The DCSP 50 may be mechanized in various ways to provide any of the following combinations of on-time $T_N$ and off-time $T_F$ of the power switch 10: (a) constant $T_N$, variable $T_F$ (b) constant $T_F$, variable $T_N$ (c) constant $(T_N + R_F)$, variable $T_N$ and $T_F$ and (d) variable $(T_N + T_F)$, variable $T_N$ and $T_F$.

The most straight-forward embodiment of the DCSP 50, which provides a constant $T_N$ and a variable $T_F$ (determined by the feedback loop), is a simple one-shot multivibrator. In this embodiment the output pulse from the threshold detector 45 activates the multivibrator which generates a pulse of specified duration (the on-time of the power switch) by which the power switch is operated.

The basic circuit shown in FIG. 1 is typically implemented in various embodiments, the variations primarily due to different means by which the ramp function and the threshold level $E_T$, of the threshold detector, are mechanized. However, this apparatus, which is based on the use of a single-loop control, suffers from certain inherent limitations. The presence of the second-order energy storage element 20 (typically an LC filter) for output ripple reduction, and the necessary use of a high gain, wide bandwidth ACSP amplifier 35 for good static regulation, high audio susceptibility reduction and fast dynamic response usually results in the risk of dynamic instability. The latter can be induced by line or load changes and variation in electrical component characteristics. Another limitation of this method is the fact that the usual long time constant associated with the energy storage element delays the rate of power switch modulation adjustment in response to dynamic line and/or load disturbances, thus compromising the dynamic response of the apparatus.

These inherent limitations are partially alleviated where the ramp of the threshold level, $E_T$, is generated as a function of the equipment input voltage $E_i$, rather than as an independent input. Here static and dynamic regulation against line changes may be improved in an open loop fashion by utilization of a line dependent ramp or threshold level. However, the dynamic performance against load changes is again hampered by the output energy storage element 20.

Other embodiments of such a single-loop feedback system exist. However all present one or more inherent limitations.

SUMMARY OF THE INVENTION

It is therefore an object of the present invention to provide a multiple feedback control for power conditioning equipment which avoids many or all of the limitations inherent in single-loop controls.

Briefly, in the present invention two (or three) control loops are provided. The first is a conventional DC output loop which senses the equipment output, essentially as described above and shown in FIG. 1. The second is an AC loop to sense the energy balance in the energy storage element 20, either in the inductor or capacitor thereof. The third is an optional transient loop which senses the rate of change of equipment output. All sensed signals are fed to the error amplifier 35 which is configured as an integrator (i.e., with a capacitive feedback).

The function of the first loop is to achieve precision output regulation; the function of the second loop is primarily to achieve improved stability; and the function of the final loop is to derive superior transient response.

DETAILED DESCRIPTION OF PREFERRED EMBODIMENT

Figure 2:
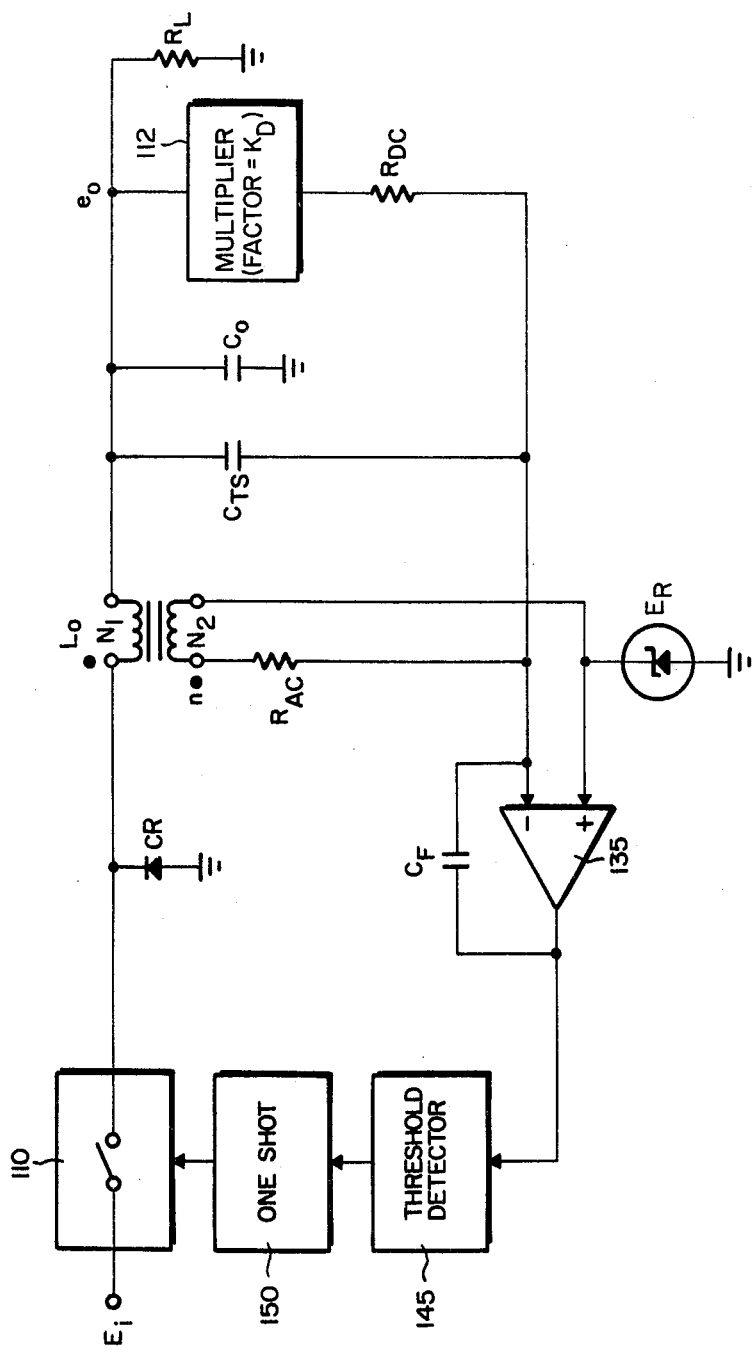
FIG. 2 is a schematic circuit diagram of a multiple-feedback loop control for power conditioning equipment according to the preferred embodiment of the present invention.

The preferred embodiment of the present invention is illustrated in FIG. 2 of the drawing. As in the prior art apparatus, the main power train comprises a power switch 110, a free-wheeling diode CR, a low-pass output filter (consisting essentially of an inductor, $L_o$, and a capacitor $C_o$) and the output load resistor $R_L$. The power switch may comprise any conventional switching element such as a transistor or SCR. The values of the output filter inductor $L_o$ and output filter capacitor $C_o$ are determined by the particular performance requirements of the apparatus, and may be readily determined by a reasonably skilled electrical engineer.

The first control feedback loop of the preferred embodiment of the present invention is similar to the single-loop control previously described. The output DC signal, $e_o$, is first directed to a multiplier 112. The multiplier is in effect a divider, and may comprise an ordinary resistance divider. The step down factor $K_D$ is the ratio of the nominal output DC level to the reference voltage $E_R$ (which, in the preferred embodiment of the invention, is provided by a zener diode).

The sensed DC output signal is passed from the multiplier through a DC gain resistor, $R_{DC}$, into the negative input terminal of an integrator amplifier 135. The reference signal $E_R$ from the zener diode is the positive input to the amplifier. The amplifier is configured as an integrator, with a feedback capacitor $C_F$.

When the output from the amplifier 135, which output includes a waveform resulting from the integration of the input thereto from a second AC-sensing loop (described below) reaches the threshold level, the threshold detector 145 will output a pulse to the DCSP which, in the preferred embodiment, is simply a one-shot multivibrator 150. The one-shot multivibrator is, in a conventional manner, adapted to generate a signal of specified duration (the on-time $T_N$ of the power switch 110) when triggered by a pulse from the threshold detector 145 (e.g., a Schmitt trigger).

Figure 1:
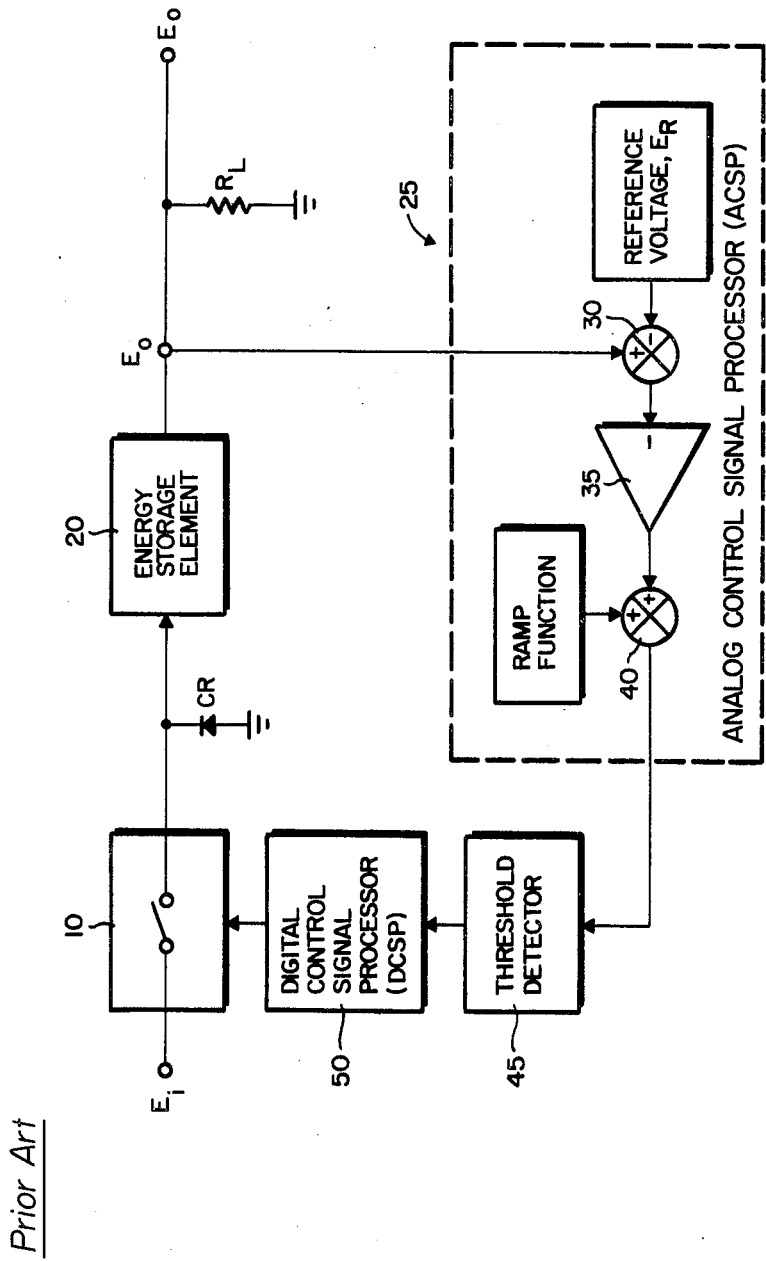
FIG. 1 is a block schematic circuit diagram of a prior art single loop feedback system for control of power conditioning equipment.

In other embodiments the DCSP which governs the operation of the power switch may differ from the one-shot multivibrator 150 incorporated in the preferred embodiment. By selection of appropriate timing logic, a task well within the skill of the ordinary practitioner, this element may be appropriately embodied to function according to any of the modes described above in connection with the prior art single loop apparatus shown in FIG. 1.

The second control feedback loop senses the AC current through the output filter capacitor $C_o$ or, in the preferred embodiment of the invention, the AC voltage across the output filter inductor $L_o$. In the illustrated (latter) embodiment, this loop operates by inducing a voltage across a signal winding $N_2$ on the inductor $L_o$. One terminal of the signal winding is connected to the positive terminal of the amplifier 135. The other is passed through an AC gain resistor $R_{AC}$ from which it is directed to the negative terminal of the amplifier.

The ratio of turns of the signal winding to the power winding is n, i.e., $N_2/N_2=n$. Thus, the second feedback loop senses the AC component of $(E_i-e_o)$ across the filter indictor $L_o$, transforms it by a factor $n$ and feeds $n(E_i-e_o)$ differentially to the integrator 135. The AC square wave voltage is integrated by the latter to yield a triangular output (ramp function) which is superimposed onto the amplified DC error from the first feedback loop and inputted to the threshold detector 145.

It should be noted that (1) this ramp function is generated from the inherent AC switching waveform within the apparatus, rather than from the DC feedback loop or from an external mechanism and (2) the separation of AC and DC feedback loops allows the control apparatus of the present invention to be applied to a wide range of switching equipment.

The third loop is provided to improve transient response by sensing the rate of change of the output voltage $e_o$ of the apparatus. As shown in FIG. 2 this loop comprises a transient sensing capacitor $C_{TS}$ whose output leads to the negative terminal of the integrator amplifier 135. The presence of this capacitor causes a signal current $C_{TS}(de_o/dt)$ to be fed into the integrator amplifier in such a way that the time constant of the LC output filter (i.e., of the inductor $L_o$ and the capacitor $C_o$) is bypassed during transient settlement, thus restoring the equipment output quickly to its nominal state.

Figure 3:
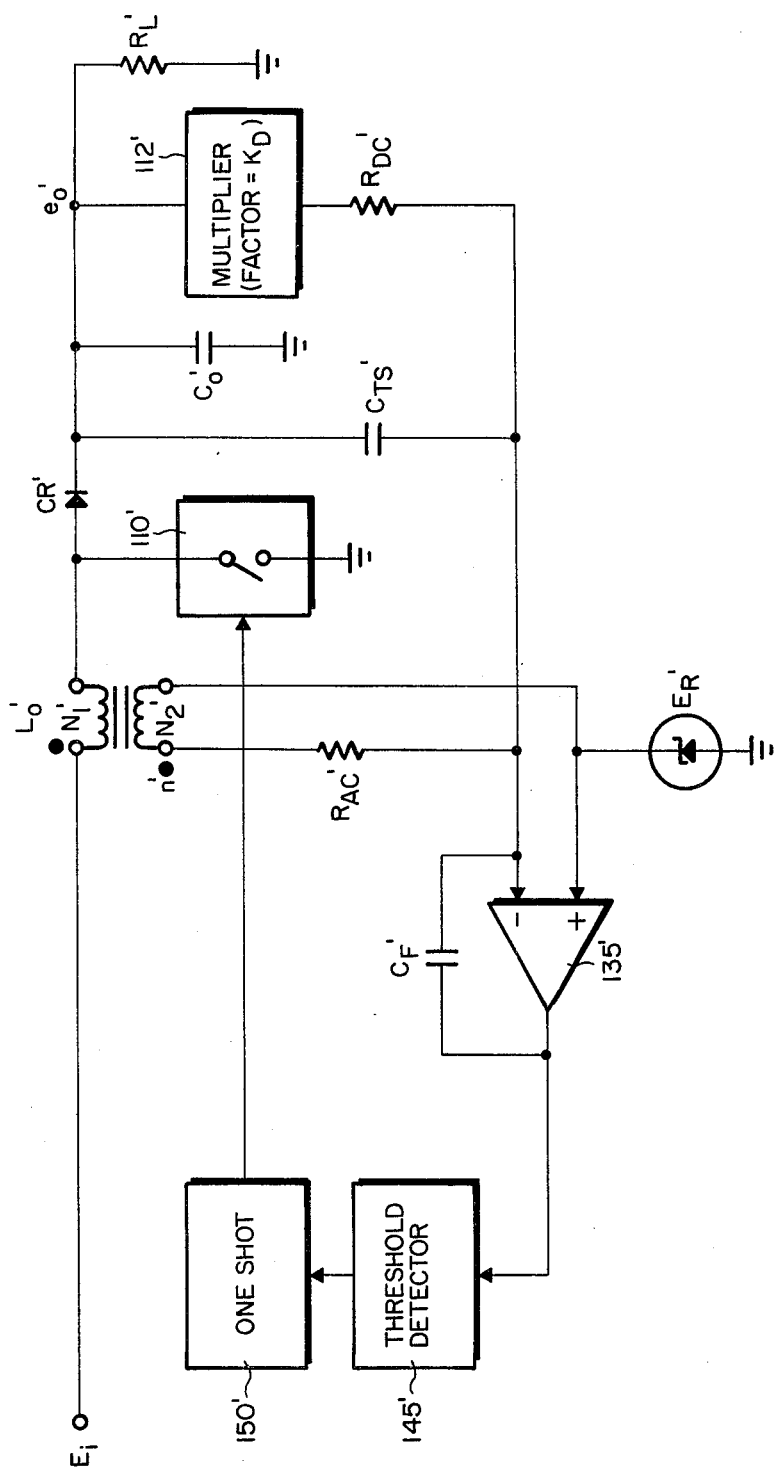
FIG. 3 is a schematic circuit diagram of a multiple-feedback loop control for power conditioning equipment of the "boost" type according to an embodiment of the present invention.

FIG. 3 shows the feedback concept hereinabove described as applied to a conventional "boost" circuit (where the output voltage exceeds the input voltage), rather than to a "buck" circuit (where the input exceeds the output), as shown in FIG. 2 and hereinabove described in detail. The primed elements in FIG. 3 are exactly similar to the corresponding elements in FIG. 2, FIG. 3 being intended merely to show another application for the concept.

We claim:

1. Control apparatus for power conditioning equipment, said equipment comprising selective switching means and an energy storage element, said energy storage element comprising a capacitor and an inductor having a power winding, said control apparatus comprising:
    first electrical means for sensing only the final output DC voltage of said equipment,
    second electrical means for sensing only the instantaneous dynamic energy level within said energy storage element, said second means comprising a signal winding on said inductor,
    amplification means, responsive to said first and second electrical means, said amplification means generating an output signal,
    threshold detection means to generate a control signal when the DC level of said amplification means output signal exceeds an established value, and
    controller means, responsive to said control signal, for selectively operating said switching means.

2. Control apparatus as recited in claim 1, wherein the input to said amplification means comprises the difference between a reference DC voltage level and the sum of the outputs from said first and second means.

3. Control apparatus as recited in claim 1, further including third electrical means for sensing the rate of change of the output from said equipment, the input to said amplification means being the difference between a reference DC voltage level and the sum of the outputs from said first, second and third electrical means.

4. Control apparatus as recited in claim 3, wherein said third means comprises a capacitor.

5. Control apparatus as recited in claim 1, wherein said controller means comprises a one-shot multivibrator.

6. Control apparatus as recited in claim 1, wherein said threshold detection means comprises a Schmitt trigger.

* * * * *